United States Patent [19]

Jones et al.

[11] Patent Number: 4,869,445
[45] Date of Patent: Sep. 26, 1989

[54] AIRCRAFT LOADING METHOD AND APPARATUS

[75] Inventors: John E. Jones; Geoffrey R. Hamblin, both of Sydney, Australia

[73] Assignee: Visy (U.K.) Limited, London, England

[21] Appl. No.: 183,380

[22] Filed: Apr. 13, 1988

Related U.S. Application Data

[63] Continuation of Ser. No. 082,986, Aug. 3, 1987, abandoned, which is a continuation of Ser. No. 758,559, filed as PCT AU84/00187 on Sep. 21, 1983, published as WO85/01263 on Mar. 28, 1985, abandoned.

[30] Foreign Application Priority Data

Sep. 21, 1983 [AU] Australia .............................. PG1515
Mar. 22, 1984 [AU] Australia .............................. PG4201

[51] Int. Cl.⁴ .............................................. B64D 9/00
[52] U.S. Cl. .................................. 244/118.1; 108/56.3; 410/52
[58] Field of Search ............. 244/118.1, 118.2, 137 R; 114/72, 75; 410/52, 94, 95, 154, 156; 248/346; 108/53.1, 53.5, 51.1, 56.3

[56] References Cited

U.S. PATENT DOCUMENTS

| | | | |
|---|---|---|---|
| 2,717,802 | 9/1955 | Martin | 410/156 |
| 3,003,452 | 10/1961 | Sangerlaub | 114/72 |
| 3,260,226 | 7/1966 | Nordgren | 108/51.1 |
| 4,475,704 | 10/1984 | Marom et al. | 108/56.1 |

FOREIGN PATENT DOCUMENTS 689904 2/1967 Belgium ............................ 108/51.1

Primary Examiner—Joseph F. Peters, Jr.
Assistant Examiner—Rodney Corl
Attorney, Agent, or Firm—Baker, Maxham, Jester & Meador

[57] ABSTRACT

A method and apparatus for extending the load support surface of an aircraft cargo pallet (8) to make use of those side areas (6) of the cargo hold located above the curved side walls of the aircraft. Triangular section load support members (9) formed from corrugated cardboard are provided on either side of the pallet, held in place by tensioning straps (19) extending either through the layers of cargo (17, 20) or inwardly and downwardly to the pallet edges. The upper surfaces of the load support members (9) form an extended load support surface (11) for the upper layers of cargo (21). extending the cargo area out toward the curved sides of the hold.

6 Claims, 4 Drawing Sheets

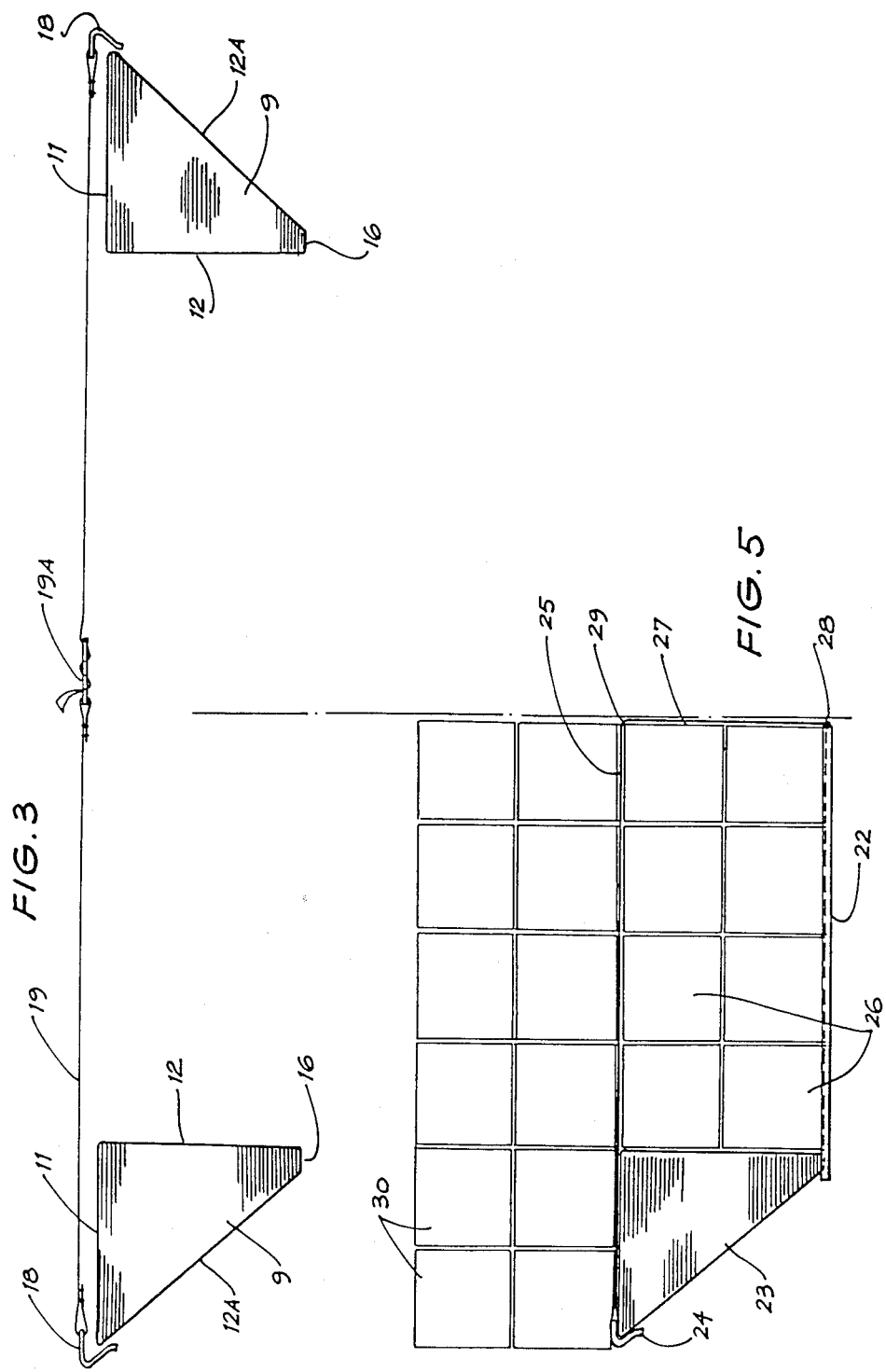

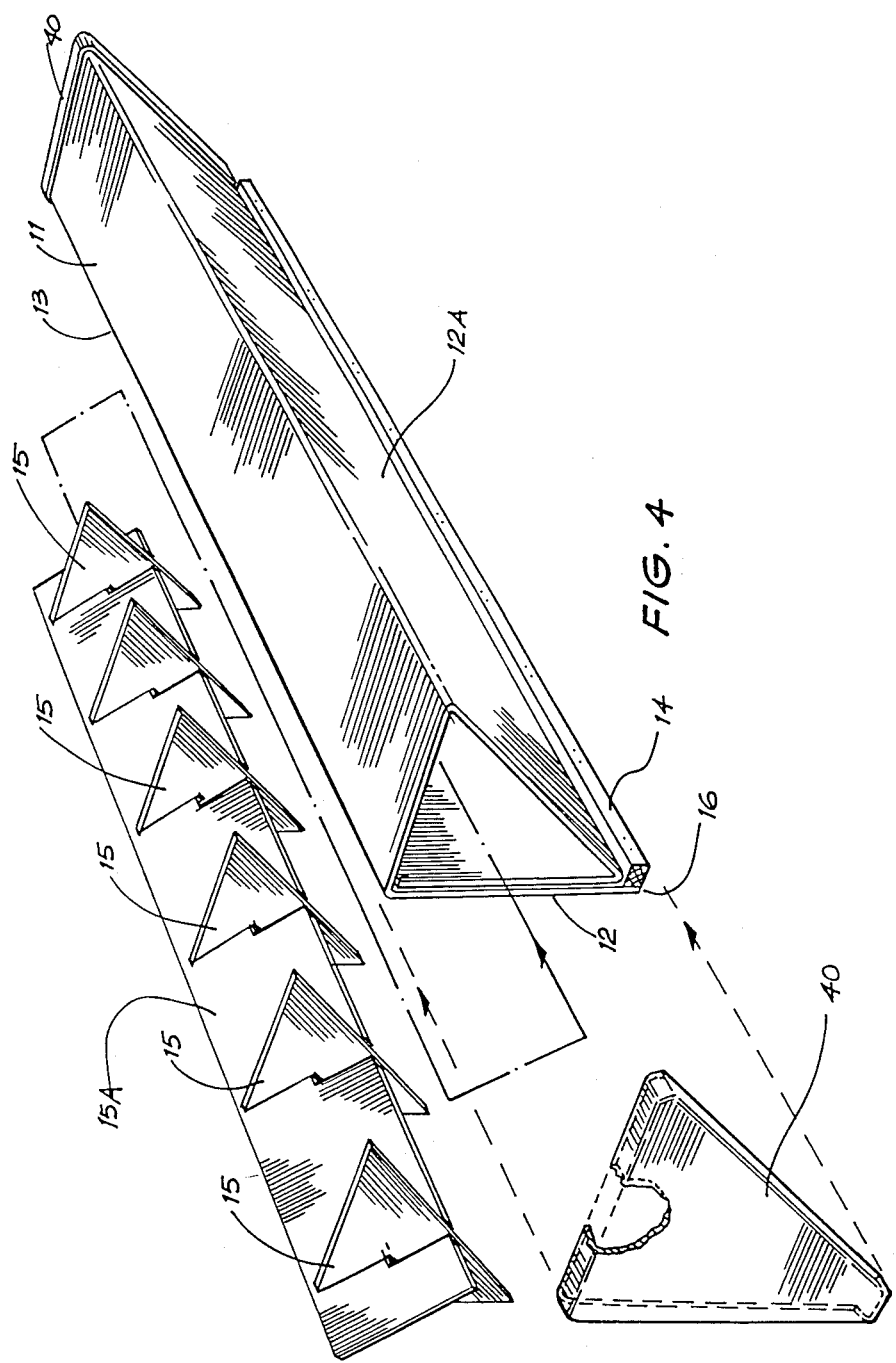

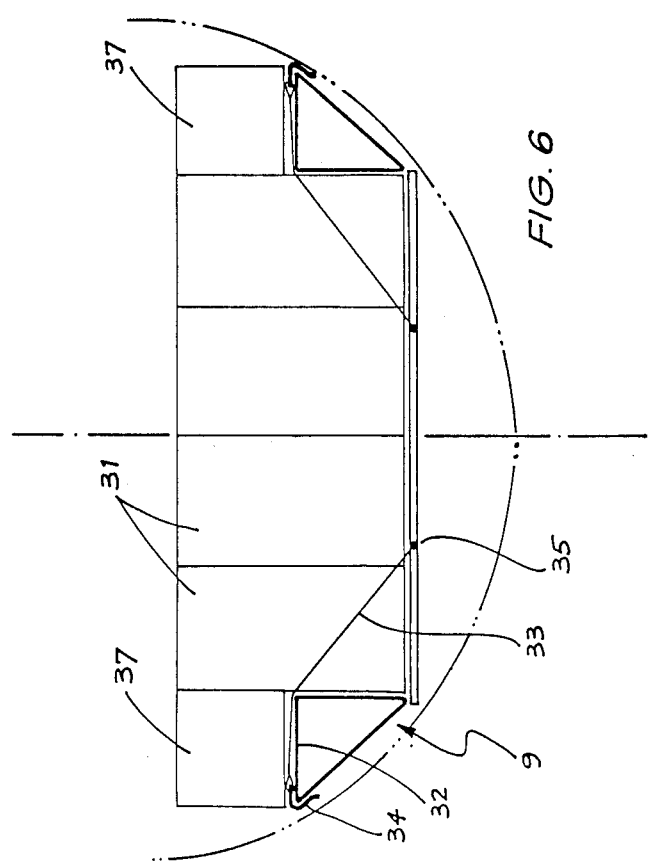

AIRCRAFT LOADING METHOD AND APPARATUS

This is a continuation of co-pending application Ser. No. 082,986 filed on 8/3/87, now abandoned, which is a continuation of Ser. No. 758,559, filed as PCT AN84/00187 on Sep. 21, 1983, published as WO85/01263 on Mar. 28, 1985, now abandoned.

TECHNICAL FIELD

This invention relates to an aircraft loading method and apparatus and has been devised particularly though not solely for the preparation of unitised loads for loading into the cargo holds of large aircraft such as the Boeing 747.

BACKGROUND ART

The cargo holds of large aircraft such as the Boeing 747 typically have a cross-section having a central flat floor area and curved or angled sidewalls rising upwardly and outwardly from the side edges of the flat floor area to meet the outer sidewalls of the cargo hold. It is a difficulty when preparing unitised loads for loading into the cargo hold, that in order to utilise the full area available, it is necessary to support the upper part of the load in a cantilevered fashion above the sloping or curved sidewall portions of the hold profile. Various attempts have been made to provide shaped pallets which will support the upper portions of the load right out to the full width of the hold cross-section but such pallets have not always been sucessful and have frequently sagged in use resulting in jamming of the load within the hold and difficulties in loading or unloading. There is also a move amongst international airfreight carriers to base their unitised loads on the cargo pallets which are designed to engage with the floor of the aircraft and it has not hitherto been possible to use such pallets and also to utilise the full width of the cargo hold area.

It is therefore an object of the present invention to provide an aircraft loading method and apparatus which will obviate or minimise the foregoing disadvantages in a simple yet effective manner, or which will at least provide the public with a useful choice.

SUMMARY OF INVENTION

Accordingly in one aspect the invention consists in a method of increasing the load carrying area of an aircraft pallet comprising the steps of:

providing at least one load support member incorporating support means adapted to be supported by one side edge of the pallet and to support a load support surface at a predetermined height above the pallet, positioning the load support member along said one edge of the pallet, and extending tension means from a position on the load support member above the pallet edge to a securing position toward the opposite side of the pallet, holding the load support member in an orientation with the load support surface extending outwardly beyond the edge of the pallet in a plane substantially parallel to the pallet restraining the load support member from tilting outwardly away from the pallet edge under load.

Preferably two said load support members are provided positioned along opposite side edges of the pallet and the tension means comprise tendons arranged to extend from a securing position on one load support member to a securing position on the other load support member between layers of cargo on the pallet. Further layers of cargo can then be loaded onto the base layers and onto the load support surfaces of the load support members.

Alternatively the tension means comprise tendons arranged to extend away from the load support member toward the opposite edge of the pallet and downwardly to the said securing position located on the pallet. In one configuration the load support member extends the entire length of the corresponding pallet side edge and the tendons are located at each end of the load support member extending inwardly and downwardly to securing positions of the pallet end edges. In an alternative configuration the tendons are arranged to extend inwardly over a base layer or cargo on the pallet and then downwardly to a securing position on the pallet side edge opposite to the load support member.

In a further aspect the invention consists in apparatus for use in conjunction with an aircraft loading pallet, said apparatus comprising:

at least one load support member incorporating support means adapted to be supported by one edge of the pallet and to support a load support surface at a predetermined height above the pallet extending outwardly beyond the edge of the pallet in a plane substantially parallel to the pallet, and tension means adapted to extend toward the opposite side of the pallet from a position on the load support member above the pallet edge and to be secured at a position remote from the load support member restraining the load support member from tilting outwardly away from the pallet edge under load.

Preferably each load support member comprises an elongate hollow triangular section member of right angled triangle configuration, one right side of the triangle forming the load support surface and the other right side together with the hypotenuse forming the support means. The support means is preferably reinforced by a plurality of triangular bulkheads spaced along the interior of the triangular section member. In this manner the load support member may be constructed from a cheap disposable sheet material such as corrugated cardboard.

Preferably the tension means comprise a plurality of tendons which are preferably adapted to be engaged with the load support members by way of an angle bracket secured to the end of each tendon, each angle bracket conforming to the angle of, and being adapted to being engaged over, the edge of the triangular section load support member between the load support surface and the hypotenuse.

In the most preferred form of the invention for use with a pallet extending across the entire width of the aircraft cargo hold two said load support members are provided adapted to extend along opposite side edges of the pallet, the tension means extending from one load support member to the other between layers of cargo on the pallet.

BRIEF DESCRIPTION OF DRAWINGS

Notwithstanding any other forms that may fall within its scope one preferred form of the invention and variations thereof will now be described by way of example only with reference to the accompanying drawings in which:

FIG. 3 is an exploded end view of the apparatus according to the invention as used in the construction shown in FIG. 2;

FIG. 4 is an exploded perspective view of one preferred form of load support member according to the invention;

FIG. 5 is a cross-sectional elevation similar to FIG. 2 showing an alternative form of the invention for use with a half-width pallet; and FIG. 6 is a cross-sectional elevation similar to FIG. 2 showing yet a further alternative form of the invention, particularly suitable for use with base loads having a height greater than the height of the load support surface.

DESCRIPTION OF THE PREFERRED EMBODIMENTS

Figure 1:
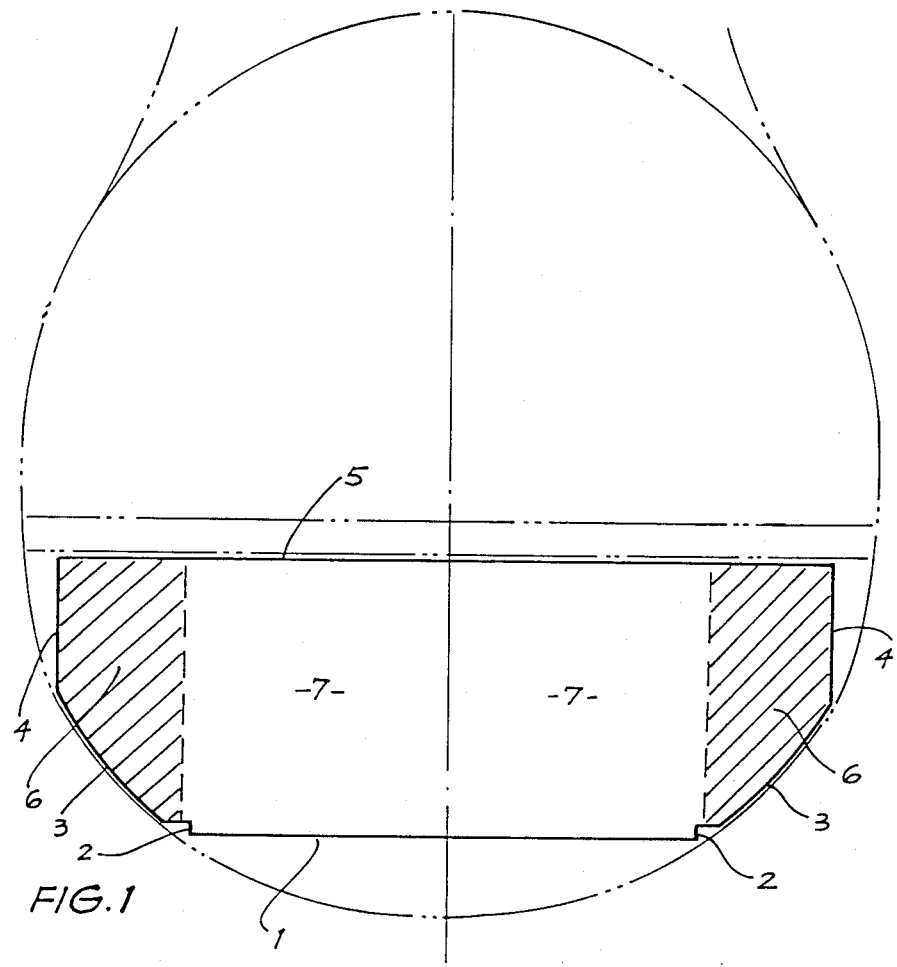
FIG. 1 is a cross-sectional outline of the cargo hold of a Boeing 747 aircraft.

In the preferred form of the invention a method of preparing a unitised load for an aircraft cargo hold is constructed as follows and is particularly applicable for use in a hold such as the lower hold of a Boeing 747 aircraft as shown in cross-section in FIG. 1. In the aircraft hold there is a flat floor 1 having edges 2 adapted to be engaged with a pallet which forms a part of the aircraft hold floor once the aircraft is loaded. The sidewalls 3 of the hold extend upwardly and outwardly from the floor 1 to the vertical sidewall portions 4 which ultimately terminate in a ceiling 5. The problem with loading a hold of this section with a unitised palletised load has always been to make use of the areas 6 which extend outwardly from the central area 7 above the floor 1, and are positioned above the sloping or curved sideall portions 3. The present invention overcomes this problem by preparing a unitised load for the aircraft hold in the following manner.

The invention utilises a conventional aircraft loading pallet 8 (FIG. 2) which is designed to be engaged with the floor 1 and edges 2 and form a part of the aircraft floor when the aircraft is loaded. The apparatus for use in conjunction with the pallet 8 comprises a pair of load support members 9 which are the same length as the side edges 10 of the pallet and which have a load support surface 11 and support means 12. In the preferred form of the invention the load support members are triangular in their cross-section which is preferably a right-angled triangle with an included right angle at the apex 13 and wherein the load support surface 11 is formed by one of the right sides of the triangle and the support means is provided by the other right side 12 (which, in use, extends down the side of the base layers of product on the pallet as will be described further below) and the hypotenuse 12A.

The actual preferred construction of the triangular section load support members can be more clearly seen with reference to FIG. 4 wherein it can be seen that the basic outline of the load support member can be formed from folding a suitable sheet material such as corrugated cardboard to a right triangular section having the upright surface 12 and the load support surface 11 defining an included right angle and being further folded on an hypotenuse portion 12A completing the third side of the triangle and providing support means in conjunction with the vertical surface 12. Further strength may be gained where necessary by reinforcing the lower edge of the load support member where it engages with the edge of the pallet by a wooden batten 14 and by wrapping the corrugated cardboard around the section to form a double wall on the vertical portion 12 as can be clearly seen in FIG. 4. The load support member may be further reinforce by a plurality of triangular bulkheads 15 evenly spaced along the length of the load support member and conveniently held in place by a longitudinal web 15A. The bulkheads may be slotted into the web as shown in the drawings. Further reinforcement may be gained by the use of triangular end caps 40 which are engaged over the ends of the load support member to close the interior of the load support member and provide further reinforcement.

Although the load support member has been described in one particular preferred form it will be appreciated that the load support member may take many other forms. For example, the triangular section formed by the sides 11, 12 and 12A may be reinforced by filling the enclosed area with a foamed plastics material. Alternatively the load support member may take a completely different configuration having, for example, a flat upper surface corresponding to the side 11 and a number of angled props extending downwardly from that surface to the lower edge 16 which in use rests on the edge of the pallet as is described below.

Figure 2:
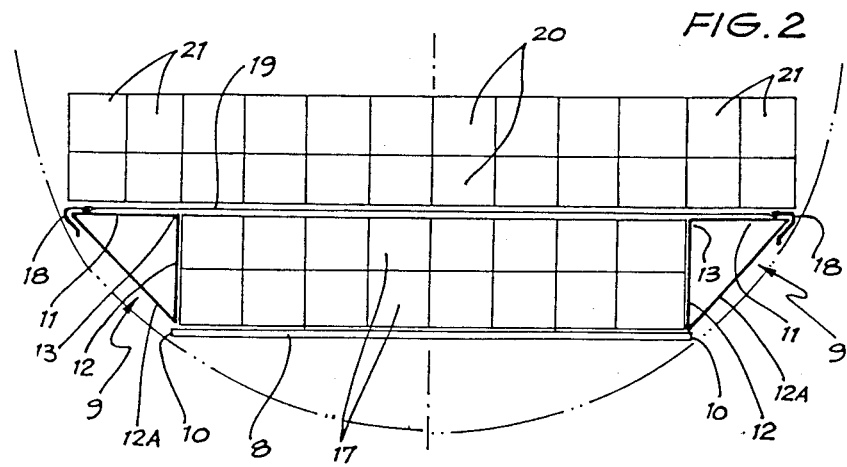
FIG. 2 is a diagrammatic view of loading apparatus according to the invention incorporated in a loaded pallet.

In use the pallet 8 is loaded with one or more base layers of product 17 which would typically comprise cartons loaded, for example, two layers deep as shown in FIG. 2. The load support members 9 are sized so that the upright side 12 is of the same predetermined height as the base layers of product loaded onto the pallet. The load support members are then placed on the pallet so that their lower edges 16 rest on and are supported by the side edges 10 of the pallet and so that the load support surfaces are parallel to the pallet and co-planar with the upper surface of the base layers of product.

The load support members are held in this position by way of angle brackets 18 which are engaged over the outer edges of the load support members (between sides 11 and 12A) and which are connected across the top of the base layers of product by tension means in the form of a tendon or strap 19. The tension means may take any suitable form but is typically a strap of plastics material provided with a tensioning buckle 19A which enables the strap to be tensioned, pulling the load support members toward one another against the edges of the base layers of product, restraining the load support members from tilting outwardly under load.

The loading of the pallet may then be completed by adding further layers 20 of cartons in which the centrally located cartons are supported directly on top of the base layers of product 17 and the outer cartons 21 are supported by the load support surfaces 11 of the load support members 9. Once the loading of the pallet has been completed the load may be held in place by nets or straps in the conventional manner.

Although the tension means has been described in the form of a pair of angle brackets 18 connected by a strap 19 it will be appreciated that the tension means may take many other forms. For example, the anchoring means provided by the angle brackets 11 may equally well be provided by anchors which are engaged with suitable holes or slots in the support members. The load support surfaces 11 may for example be provided with keyhole slots which may be engaged by suitable lugs at either end of the strap 19. Alternatively the strap 19 may wrap completely around the outer edges of the load support members and be anchored on the side edges 10 of the pallet 8. In yet a further form of the invention the tension means may comprise a continuous metal strip which extends across the top of the base layers of product and the load support surfaces 11 and which terminates in re-entrant flanges forming the same construction as the angle brackets 18.

Once the pallet has been loaded as shown in FIG. 2, it may be inserted into the aircraft cargo hold and moved longitudinally into place within the hold on the rollers provided in the aircraft floor. The load support members 9 on either side of the pallet enable the areas 6 of the hold to be filled with product, in this case typically shown by the cartons 21.

In an alternative form of the invention the apparatus may be used to load a half-width pallet 22 as shown in FIG. 5. In this configuration a single load support member 23 is used, held in place by a similar angle bracket 24 which is supported by tension means 25 in the form of a strap which may typically pass across the top of the base layers 26, and extend down the side 27 of the base layer to be anchored to the edge of the pallet at 28. Alternatively the tension strap 25 may be anchored by a suitable angle bracket on the corner edge 29 or in any other suitable manner. The loading of this half pallet is then exactly the same as for the full pallet described with reference to FIG. 2 and simply involves the loading of further layers 30 on top of the base layers 26 and the load support member 23.

In a still further form of the invention where it is desired to extend the loading surface of a pallet to be used with a base load 31 (FIG. 6) having a height greater than the height of the load support surface 32 of the load support member 9 the tension means may be rearranged so as not to pass between layers of product. In this form of the invention there are two tension means in the form of straps or cables 33 for each load support member located at either end of the load support member so that the cable may extend from a bracket 34 on the outer edge of the load support member, across the top surface of the load support member and then downwardly past the end of the load 31 to an anchor point 35 located on the end edge of the pallet 8. Where necessary a further clip or protector plate (not shown) may be provided at the corner 36 to hold the cable securely in place on the load support member and prevent the retaining strap from cutting into the triangular section 9. Where necessary to reinforce the load support members or to prevent sagging between the straps or cables 33, the outer edge of the load support member may be reinforced by a metal angle strip (not shown) placed over the edge but underneath the brackets 34. This metal angle prevents deformation of the cardboard load support member under the brackets 34 and also acts as a beam to prevent sagging between brackets.

In this form of the invention the pallet may be loaded with base product 31 which is higher than the load support surface 32, and the loading of the pallet may be completed by applying further product 37 to the load support surface 32. It will be appreciated that this form of the invention may be utilised either on a full width pallet having load support members 9 on two opposite edges of the pallet (as shown in FIG. 6), or on a half pallet in a similar configuration to that shown in FIG. 5. Similarly the load support members, although shown as a triangular section may be provided in any other suitable configuration as previously described.

In this manner apparatus is provided which in a simple, cheap and effective manner enables the shaped cargo hold of an aircraft to be effectively loaded utilising the full width of the aircraft hold for the upper layers of product. It is generally intended that the load support members 9 will be "one trip" or disposable components conveniently formed by folding cardboard as shown in FIG. 4.

We claim:

1. Apparatus for use in conjunction with an aircraft loading pallet, said apparatus comprising:
   at least one load support member incorporating support means adapted to be supported by one edge of the pallet and to support a load support surface at a predetermined height above the pallet extending outwardly beyond the edge of the pallet in a plane substantially parallel to the pallet, said load support member comprising an elongate, hollow, triangular section member; and
   tension means adapted to extend toward the opposite side of the pallet from a position on said load support member above the pallet edge and to be secured at a position remote from said load support member restraining said load support member from tilting outwardly away from the pallet edge under load.

2. Apparatus as claimed in claim 1, wherein the triangular section comprises a right angled triangle, one right side forming the load support surface and the other right side together with the hypotenuse forming the support means.

3. Apparatus as claimed in claim 1, wherein the support means is reinforced by a plurality of triangular bulkheads spaced along the interior of the triangular section member.

4. Apparatus as claimed in any one of claims 1, 2 or 3, wherein the load support member is constructed from cardboard material.

5. Apparatus as claimed in claim 1, wherein the tension means comprise a plurality of tendons and wherein each tendon is adapted to engage the load support member by way of an angle bracket secured to the end of the tendon, the angle bracket conforming to the angle of, and being adapted to be engaged over, the edge of the triangular section load support member between the load support surface and the hypotenuse.

6. Apparatus as claimed in any one of claims 1, 2, 3 or 5, wherein two said load support members are provided adapted to extend along opposite side edges of the pallet and wherein the tension means are adapted to extend from one load support member to the other between layers of cargo on the pallet.

* * * * *